No. 668,738. Patented Feb. 26, 1901.
O. O'SULLIVAN.
NUT LOCK.
(Application filed June 8, 1900.)
(No Model.)

Witnesses:
J. M. Fowler Jr.
G. A. Brereton

Inventor:
Otho O'Sullivan,
by Gales P. Moore
his Atty.

THE NORRIS PETERS CO., PHOTO-LITHO., WASHINGTON, D. C.

UNITED STATES PATENT OFFICE.

OTHO O'SULLIVAN, OF STONINGTON, CONNECTICUT.

NUT-LOCK.

SPECIFICATION forming part of Letters Patent No. 668,738, dated February 26, 1901.

Application filed June 8, 1900. Serial No. 19,581. (No model.)

*To all whom it may concern:*

Be it known that I, OTHO O'SULLIVAN, a citizen of the United States, residing at Stonington, in the county of New London, State of Connecticut, have invented certain new and useful Improvements in Nut-Locks, of which the following is a description, reference being had to the accompanying drawings and to the letters of reference marked thereon.

My invention relates to improvements in nut-locks, and is more particularly an improvement upon the construction of such devices disclosed in my Patent No. 640,690, dated January 2, 1900, such nut-lock being of the type in which the nut is compressed upon the threads of the bolt by an inclosing collar.

My object is to provide a construction which can be manufactured at a minimum expense, which economizes space, in which the nut yields readily and evenly, thus reducing strain on the collar, in which a relatively thin collar can be employed and said collar is strengthened at the points of strain, and in which the friction between the nut and collar is reduced, thus facilitating the operation of placing the nut-lock upon a bolt.

To these ends and also to improve generally upon devices of the nature indicated my invention consists in the various matters hereinafter described and claimed.

Figure 1:
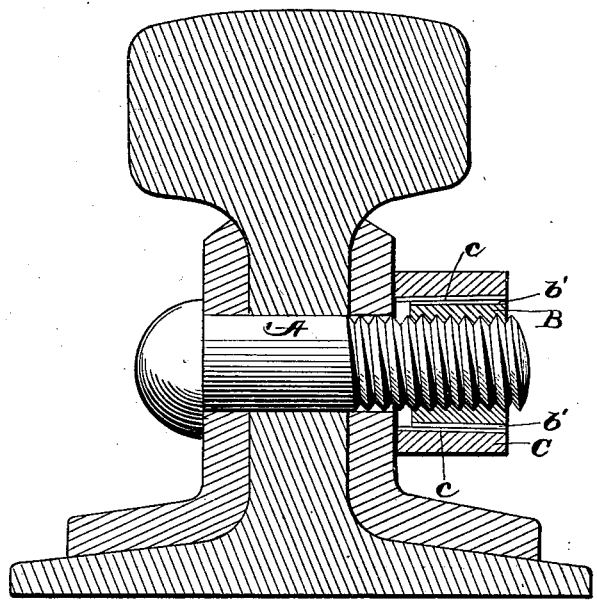
Figure 2:
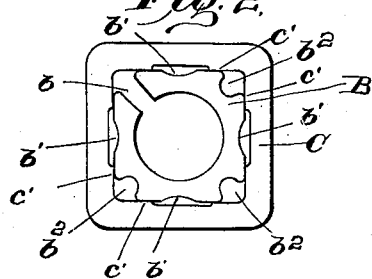

In the accompanying drawings, Figure 1 is an elevation, chiefly in section, showing the present nut-lock applied to a bolt upon a rail; and Fig. 2 is a front elevation of the nut-lock alone.

Referring now more particularly to the drawings, A represents a threaded bolt of usual construction, B the polygonal nut, and C the polygonal compressing-collar therefor, said nut and collar constituting the present nut-lock. The nut tapers inwardly in cross-section—*i. e.*, toward the fish-plate or other member against which it is to be screwed—and the collar has a correspondingly-tapering opening to receive said nut, the nut and collar fitting each other snugly, whereby when the collar is placed over the bolt with its inner end against the fish-plate and the nut started along the threads until the inner nut end enters the collar rotation of the collar feeds the nut along the threads and farther into said collar, thus by reason of the tapering inner walls $c$ of the collar at the same time compressing the nut on the threads, as fully described in my said prior patent. In order to permit the necessary compression and yielding of the nut, a kerf $b$ extends the length of said nut from the central threaded opening to one corner, and longitudinal grooves $b'$ are formed in the outer nut-faces. In the present nut the kerf or corner-opening $b$ is made relatively wide and the remaining nut-corners are cut away, as illustrated at $b^2$. Thus when the nut enters the collar there is no material fitting into the collar-corners and the nut is permitted to readily yield into said corner-spaces, whereby the collar is relieved of much of the strain heretofore exerted by nuts having solid corners, while at the same time the nut is firmly compressed. Furthermore, the friction heretofore existing at the corners is avoided, and the nut can therefore be more quickly run into set position. Manifestly the nut cut away at the corners, as well as at the central portion of its faces, yields evenly. By thus reducing the strain exerted upon the collar I am enabled to make said collar materially narrower than is possible when a nut having solid corners is employed, and by reinforcing the inner corners, as at $c'$, by a strip of additional material the body portion of the collar can be still further reduced. The collar employed with the present nut is illustrated in the drawings and is relatively narrow, but reinforced at the points of greatest strain, this collar being entirely efficient for the use to which it is put. Furthermore, the reinforcing-strips, which contact with the collar-faces, serve to hold a considerable portion of each face out of contact with the collar-walls, thus further reducing the friction between the nut and collar, and therefore facilitating the operation of forcing the nut into said collar.

The above-described nut and collar can be cast of steel or malleable iron, can be cheaply manufactured, and the nut-lock including them economizes space upon the work. The collar is strengthened at the necessary points, undue strain is taken from it, and the friction heretofore existing between the nut and collar at the corners is avoided, thus facilitating the operation of setting the parts upon a bolt. The nut is firmly and evenly held upon the threads, and the entire structure is a cheap, simple, and efficient nut-lock.

Having thus described my invention, what I claim as new, and desire to secure by Letters Patent, is—

1. The combination with a polygonal nut, of a polygonal collar for compressing the same, one of the said parts being cut away at the corners to leave spaces at said corners between the nut and the collar to allow for expansion of the former; substantially as described.

2. The combination with a polygonal nut having its corners cut away, of a polygonal compressing collar about said nut, whereby spaces are left at the corners between the nut and the collar to allow for expansion of the former; substantially as described.

3. The combination with a polygonal nut, of a polygonal collar about the same, said nut being adapted to be forced into the collar and thereby compressed, one of the said parts being cut away at the corners to leave spaces at said corners between the nut and the collar to allow for expansion of the former; substantially as described.

4. The combination with a polygonal nut, of a polygonal collar about the same, said nut being adapted to be forced into the collar and thereby compressed, said nut having its corners cut away whereby spaces are left at the corners between the nut and collar to allow for expansion of the former; substantially as described.

5. The combination with a polygonal nut, of a polygonal collar about said nut, said nut and collar having adjacent surfaces one of which tapers, whereby the nut is compressed as it enters the collar, said nut having its corners cut away whereby spaces are left at the corners between the nut and collar to allow for expansion of the former; substantially as described.

In testimony whereof I affix my signature in presence of two witnesses.

OTHO O'SULLIVAN.

Witnesses:
CHARLES B. SLATER,
J. H. TILLINGHAST.